F. L. STUART.
CONVEYING SYSTEM.
APPLICATION FILED MAY 8, 1919.

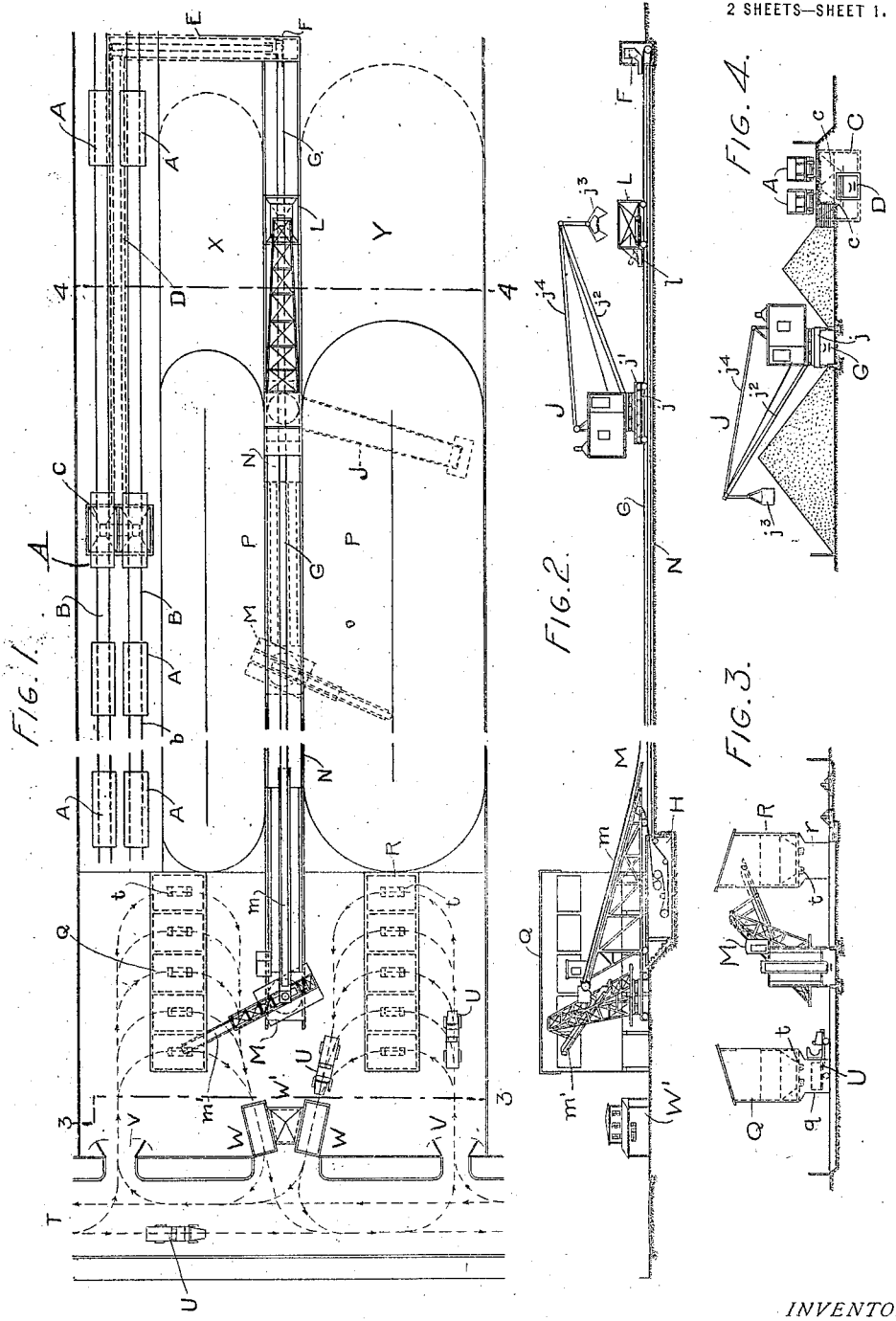

1,324,184.

Patented Dec. 9, 1919.
2 SHEETS—SHEET 2.

INVENTOR
Francis Lee Stuart.
By his attorneys,
Baldwin & Wight ered.

UNITED STATES PATENT OFFICE.

FRANCIS LEE STUART, OF NEW YORK, N. Y., ASSIGNOR TO INTERNATIONAL CONVEYOR CORPORATION, OF NEW YORK, N. Y., A CORPORATION OF NEW YORK.

CONVEYING SYSTEM.

1,324,184.      Specification of Letters Patent.      Patented Dec. 9, 1919.

Application filed May 8, 1919. Serial No. 295,717.

*To all whom it may concern:*

Be it known that I, FRANCIS LEE STUART, a citizen of the United States, residing in New York city, county and State of New York, have invented certain new and useful Improvements in Conveying Systems, of which the following is a specification.

This invention relates to conveying systems in which material, such as coal, is received from carriers, such as railway cars, and conveyed to a place of storage where it is delivered and from which it is taken for transportation.

In one embodiment of my invention, especially designed for handling coal, the material is brought to a storage plant or yard by railway cars and delivered through a track hopper to a conveyer belt, which by means of another associated belt delivers the material to a third belt extending between open spaces on opposite sides of the belt for storage of the material. This last mentioned belt which I call the main conveyer belt, is arranged below a track, on which is mounted a stacker, trimmer or deliverer for delivering the material from the main conveyer belt to the storage spaces or to bins arranged on opposite sides of the belt at one end thereof. The stacker, trimmer, or deliverer is adapted to move back and forth on the track and the belt is provided with a tripper which delivers to a boom conveyer, in turn delivering to the places of storage or to the bins. I also mount on the track a reclaimer by means of which material may be taken from the storage places and delivered to the main conveyer belt, which in turn delivers to the storage bins by means of the stacker, trimmer, or deliverer. A truck hopper is associated with the reclaimer in such manner that the latter may more efficiently deliver to the main conveyer belt. The storage bins are mounted on supports which are constructed to provide driveways below the bins, which latter are provided with gates or valves by means of which they may deliver to carts or trucks below them. The driveways are so arranged in the plant or yard that carts or trucks may, without confusion, pass into the yard below the bins and out again over scales by which the loads are weighed before the carts or trucks leave the yard.

In the accompanying drawings:—

Figure 1 is a plan view of a storage plant or yard embodying my improvements.

Fig. 2 is a side elevation of the apparatus with parts in section.

Fig. 3 shows a cross section on the line 3—3 of Fig. 1.

Fig. 4 shows a transverse section on the line 4—4 of Fig. 1.

Figure 5:
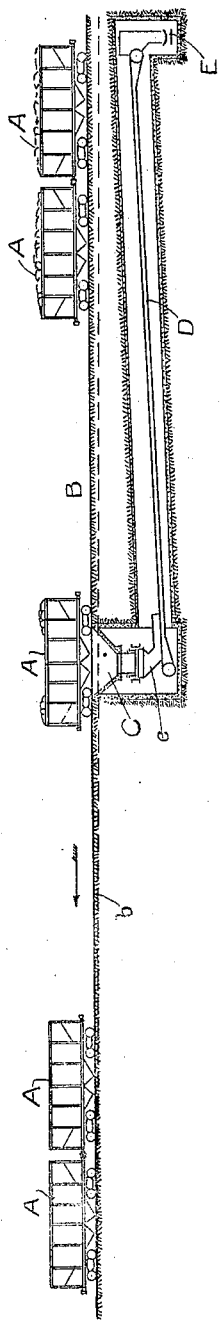
Fig. 5 is a longitudinal section showing particularly the track hopper and the manner in which cars pass over it.
Figure 6:
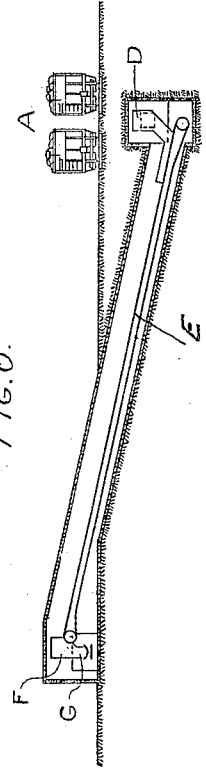
Fig. 6 is a detail view in section of the cross belt leading from the track hopper belt to the main conveyer belt.

Fig. 1 illustrates a storage plant or yard in which A indicates railway cars bringing coal to the yard over tracks B. The cars deliver to a track hopper C which accommodates two trains of cars, two funnels c (Fig. 4) being used to deliver to a receiving belt D. The parts b of the tracks are inclined slightly downward as shown, so that cars after delivering to the hopper may run down the inclines and wait there for a locomotive to draw them out. The belt D extends from the hopper to a transversely arranged belt E which delivers through a hopper F to the main conveyer belt G, which extends between two open storage spaces X and Y to a well or pit H containing the belt driving mechanism. A stacker, trimmer, or deliverer M is supported on a track N parallel with and over the main conveyer belt, and this stacker supports a tripper or loop *m* of the belt which delivers to a boom conveyer *m'*, which in turn delivers to the piles P in the storage spaces or to storage bins Q and R. These bins are arranged just inside the yard adjacent a city street T. Preferably a series of bins are employed on opposite sides of the stacker, and these bins are held elevated by frames *q*, *r*, so as to provide driveways beneath the bins as indicated in Fig. 3. The bins are provided with gates or valves *t* which may deliver to carts or trucks U as indicated in Fig. 3. Carts or trucks may enter the yard from the street through gates V and pass under the bins in the manner indicated by arrows in Fig. 1. After being loaded the carts or trucks should pass onto scales W, preferably arranged in the manner indicated, with an office W' between them. From the scales the trucks pass to the city street. By this system, when cars arrive laden with coal they may deliver through the track hopper to the main conveyer belt. When the bins are empty they may be filled by means of the stacker, trimmer, or deliverer, but if the bins are well supplied the stacker may deliver to the storage piles P, sufficient spaces X and Y being provided to accommodate piles of great size.

Should bins become empty and cars fail to arrive, the bins may be supplied with material from the storage piles by means of a reclaimer J, said reclaimer being an apparatus for taking the material from the piles and delivering it to the main conveyer belt. The particular apparatus illustrated for this purpose in the drawings is a crane J, comprising a truck $j$ adapted to run on the track N, a turntable $j'$, a boom $j^2$, a grab bucket $j^3$, and means $j^4$ for operating the grab bucket. This apparatus is of well known construction. Instead of delivering from the bucket directly to the main conveyer I employ a truck hopper L which receives material from the bucket and delivers through a chute $l$ to the main conveyer belt. The reclaimer J and the hopper L may be moved over the main conveyer belt to the desired position to transfer material from the piles to the belt.

The stacker, reclaimer, and truck hopper may be propelled by motors which they carry and the stacker and reclaimer may have their various parts operated by motor mechanism mounted on their trucks. The details of construction of the stacker are not herein shown or described as they will form the subject matter of another application for patent. I would say, however, that a stacker of the kind shown more in detail in my Patent No. 1,275,319 of August 13, 1918, may be employed, and instead of using a reclaimer of the kind illustrated, a reclaimer such as shown in my Patent No. 1,271,627 of July 9, 1918 may be used.

By means of the system herein shown and described, a city may be supplied with coal in a most systematic and efficient way. The cars bringing the coal to the yard may enter and depart without confusion, the coal being transferred from a track hopper to the main conveyer belt associated with apparatus which may deliver to storage spaces or to storage bins. The bins may always be kept supplied with coal, either directly from cars or from storage spaces. Carts or trucks can enter and depart from the yard without confusion, receiving coal from the bins while passing through the yard and having the coal weighed before leaving it.

The stacker shown in the accompanying drawings and hereinbefore described, is not herein claimed specifically. Certain features of construction of said stacker are claimed in my application for Patent No. 300,973, filed May 31, 1919.

I claim as my invention:—

1. A conveying system for receiving and delivering material, comprising a receiving conveyer, a track hopper delivering thereto, a main conveyer belt, means for transferring material from the receiving conveyer to the main conveyer belt, a stacker, trimmer, or deliverer movable endwise over the main conveyer belt, and supporting a tripper of said belt, a boom conveyer associated with said tripper, storage spaces to which the stacker delivers, a bin to which the stacker also delivers, and a reclaimer for transferring material from the storage spaces to the main conveyer belt.

2. A conveying system for storage yards, comprising a receiving conveyer, a main conveyer belt, means for transferring material from the receiving conveyer to the main conveyer belt, a track parallel with said main conveyer belt, a stacker, trimmer or deliverer supported on said track and associated with said belt, a series of elevated bins having driveways beneath them and provided with gates or valves for the delivery of material to trucks or carts in said driveways, entrance and exit ports to and from the bins, and scales at the exit ports over which the trucks or carts pass when leaving the yard.

3. A conveying system for city coal yards, comprising a receiving conveyer, a track associated therewith over which cars enter the yard and deliver to the receiving conveyer, and which is provided with a downwardly inclined portion for empty cars, a track hopper receiving material from the cars and delivering to the receiving conveyer, a main conveyer belt, means for transferring material from the receiving conveyer to the main conveyer belt, storage spaces on opposite sides of the main conveyer belt, a track associated with the main conveyer belt, storage bins on opposite sides of the main conveyer belt having driveways beneath them and provided with delivery valves, entrance and exit ports from the city street to the yard, scales at the exit port, a stacker, trimmer, or deliverer associated with the main conveyer belt for delivering material therefrom to the storage spaces or to the bins, a reclaimer associated with the main conveyer belt for gathering material from the storage spaces, and a wheeled hopper receiving material from the reclaimer and delivering to the main conveyer belt.

In testimony whereof, I have hereunto subscribed my name.

FRANCIS LEE STUART.